United States Patent
Wong et al.

(10) Patent No.: US 11,310,845 B2
(45) Date of Patent: Apr. 19, 2022

(54) WIRELESS MANAGEMENT AND CONNECTIVITY ACROSS MULTIPLE NETWORKS

(71) Applicant: Charter Communications Operating, LLC, St. Louis, MO (US)

(72) Inventors: Curt C. Wong, Bellevue, WA (US); Yildirim Sahin, Englewood, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 10 days.

(21) Appl. No.: 16/850,133

(22) Filed: Apr. 16, 2020

(65) Prior Publication Data
US 2021/0329716 A1    Oct. 21, 2021

(51) Int. Cl.
*H04W 76/11*    (2018.01)
*H04W 8/02*    (2009.01)
*H04W 12/08*    (2021.01)

(52) U.S. Cl.
CPC .............. *H04W 76/11* (2018.02); *H04W 8/02* (2013.01); *H04W 12/08* (2013.01)

(58) Field of Classification Search
CPC ........ H04W 76/11; H04W 8/02; H04W 12/08
See application file for complete search history.

(56) References Cited

U.S. PATENT DOCUMENTS

| | | | |
|---|---|---|---|
| 2006/0193308 A1* | 8/2006 | Sung | H04L 29/1233 370/352 |
| 2021/0105712 A1* | 4/2021 | Speicher | H04W 48/08 |
| 2021/0112423 A1* | 4/2021 | Maheshwari | H04W 8/08 |
| 2021/0184875 A1* | 6/2021 | Qiao | H04W 76/18 |

OTHER PUBLICATIONS

"3rd Generation Partnership Project; Technical Specification Group Services and System Aspects; Study on enhanced support of Non-Public Networks (Release 17)", 3GPP Standard; Technical Report; 3GPP TR 23.700-07, 3RD Generation Partnership Project (3GPP), Mobile Competence Centre; 650, Route Des Lucioles ; F-06921 Sophia-Antipolis Cedex; France,,No. V0.3.0, Jan. 28, 2020 (Jan. 28, 2020), pp. 1-41, XP051860850.

(Continued)

*Primary Examiner* — Wayne H Cai
(74) *Attorney, Agent, or Firm* — Armis IP Law, LLC (57) ABSTRACT

A communication management resource receives notification of a request from user equipment to establish a wireless communication link with a remote communication device through a first private wireless network. The communication management resource resides in a second private wireless network to which the user of the user equipment is a member. The request requests use of services provided by the second private wireless network to connect the user equipment to a remote communication device. In response to receiving the request, the second private wireless network retrieves a unique network identifier value assigned to the first private network. Via the unique network identifier value, the communication management resource detects that the first private wireless network is associated with the second wireless network. Based on the association, the communication management resource support communications between the user equipment and the remote communication device.

37 Claims, 8 Drawing Sheets

(56) References Cited

OTHER PUBLICATIONS

Apple: 11 Solution of Key Issue #5: Support of Equivalent SNPN 11, 3GPP Draft; S2-2000748, 3RD Generation Partnership Project (3GPP), Mobile Competence Centre; 650, Route Des Lucioles ; F-06921 Sophia-Antipolis Cedex; France, vol. SA WG2, No. Incheon, South Korea; Jan. 13, 2020-Jan. 17, 2020, Jan. 7, 2020 (Jan. 7, 2020), XP051842802.
International Search Report, PCT/US2021/024093, dated Jul. 9, 2021, pp. 1-12.

* cited by examiner

FIG. 1

TABLE
165

UNIV = AAAA
UNIV = DDDD
UNIV = EEEE
...

WIRELESS MANAGEMENT AND CONNECTIVITY ACROSS MULTIPLE NETWORKS

BACKGROUND

Conventional 5G System architectures are designed to support a wide variety of networks, including 5G PLMN (Public Land Mobile Network) and private networks (a.k.a., SNPN—Standalone Non-Public Network). Implementation of SNPNs using the 5G architecture is defined in 3GPP TS 23.501 Release 16.

In general, as its name suggests, the SNPN in 5G allows private entities to support wireless communications to members of an organization. Such networks are useful because a corresponding service provider (such as a company) has more control over such a network.

BRIEF DESCRIPTION OF EMBODIMENTS

There are deficiencies associated with conventional SNPN wireless networks. For example, current 3GPP IMS architecture for PLMN uses IMS AKA (Internet Protocol Multi-Media Subsystem Authentication and Key Agreement) (i.e., ISIM based) for mutual authentication. For SNPN, other types of authentication (e.g., Transport Layer Security or TLS) can be used for the SNPN subscribers. However, it is not known how a non IMS AKA solution would work in an IMS roaming scenario, especially when a respective P-CSCF (Proxy—Call Session Control Function) is located in the serving network.

Embodiments herein include providing unique wireless services in a network environment including multiple private wireless networks.

More specifically, a communication system includes a first private wireless network, a second private wireless network, and user equipment. The user equipment (such as a communication device) is a member of the second private wireless network but is authorized to use both the first private wireless network (such as a serving network) and the second private wireless network (such as a home network). In one embodiment, the first private wireless network supports roaming of the user equipment when the user equipment is out of wireless range with respect to its home network.

For example, assume that the communication device would like to establish a connection while roaming outside of the second private wireless network (its home network). To establish a wireless communication link for the user equipment while the user equipment is roaming outside the second private wireless network, the user equipment communicates a link request to the first private wireless network that supports roaming. The first private wireless network communicates the link request to a communication management resource in the second private wireless network.

Based on notification of the received request, the communication management resource in the second private wireless network retrieves (such as via communication with an entity in the first private wireless network) a unique network identifier value assigned to the first private network.

Via the unique network identifier value, the communication management resource detects that the first private wireless network has an association with the second wireless network and that the roaming user equipment should be provided requested wireless services. Based on the association, the communication management resource in the second private wireless network supports communication services between the user equipment and a target remote communication device (such as a target device to which a call from the requesting communication device is directed) via a communication link extending through a combination of the first private wireless network and the second private wireless network.

In one embodiment, based on the association and corresponding agreement between service providers of the first private wireless network and the second private wireless network, the communication management resource (in the second private wireless network) establishes a communication path/link between the first private wireless network and the second private wireless network in response to detecting that the first private wireless network is authorized to provide wireless roaming services to the user equipment through the first private wireless network.

In accordance with further example embodiments, the first private wireless network is a serving stand-alone non-public wireless network (such as based on LTE or other suitable protocol) supporting roaming of the user equipment; the second private wireless network is a home stand-alone non-public wireless network (such as based on LTE or other suitable protocol) to which the user of the user equipment is a member.

In accordance with further example embodiments, the services requested by the user equipment are wireless voice services supporting connectivity between the user equipment and a remote (target) mobile communication device. The system as described herein provides connectivity between the user equipment through a combination of the first private wireless network and the second private wireless network to the remote (target) communication device. In one embodiment, as previously discussed, the user equipment generates the request to establish a respective voice phone call to the remote communication device.

In yet further example embodiments, the request for services from the user equipment to the first private wireless network is a SIP (Session Initiation Protocol) registration request. As previously discussed, the request enables/prompts the second private wireless network to retrieve the unique identifier value from the first private wireless network and establish a communication path through the second private wireless network to support the roaming services.

Note that the unique network identifier value assigned to the first private wireless network can be any suitable value or retrieved from any suitable entity. In one embodiment, the communication management resource retrieves (receives) the unique network identifier value assigned to the first private network from an entity (such as a communication management resource) in the first private wireless network.

In still further embodiments, the request initiated by the user equipment includes a unique device identifier value (such as network address or other suitable value) assigned to the user equipment. In one embodiment, the communication management resource in the second private wireless network uses the unique device identifier value to detect that the user equipment belongs to (or corresponding user of the user equipment is an authorized member of) the second private wireless network (home network).

In response to detecting that the user equipment is authorized (as a member) to use the second private wireless network, the communication management resource of the second private wireless network communicates with the first private wireless network to retrieve the unique network identifier value of the first private wireless network.

In one nonlimiting example embodiment, the communication management resource retrieves the unique network identifier value assigned to the first private network via N24 signaling between the communication management resource in the second private wireless network and a management entity (such as a V-PCF) in the first private wireless network.

The unique network identifier value assigned to the first private wireless network can be any suitable value and retrieved from any suitable resource. In one embodiment, the unique network identifier value is a PLMNID (Public Land Mobile Network IDentifier) and NID (Network IDentifier) assigned to the first private wireless network.

In accordance with further example embodiments, the communication management resource uses the unique network identifier value as a basis to determine whether the user equipment (known to be a member of the second private wireless network) is entitled to use the requested communications services as specified by the request.

In one embodiment, the communication management resource compares the unique network identifier value (of the first private wireless network) to values in a look-up table. In response to detecting presence of the identity of the unique network identifier value in the look-up table, the communication management resource determines that the first private wireless network supports roaming and that the unique equipment is authorized to use the first private wireless network.

In yet further embodiments, the first private wireless network is operated by a first service provider; the second private wireless network is operated by a second service provider. The second private wireless network is operated independently of the first service provider. However, as previously discussed, the second service provider has a roaming agreement with the first service provider. For example, the first private wireless network service provider provides roaming wireless services to the user equipment but must rely on the first private wireless network to complete connectivity to a target communication device as specified by the user equipment.

As previously discussed, in one embodiment, the user equipment generates the registration request in order to establish a voice communication session (such as a phone call) with a remote communication device over the first private wireless network. As described herein, a communication path extending between the user equipment through a combination of the first private wireless network and the second private wireless network supports the requested wireless voice services and connects the user equipment to the remote communication device.

These and additional embodiments are further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as one or more co-located or disparately processor devices) to: receive a request from user equipment in wireless communication with a first private wireless network, the request requesting use of services provided by a second private wireless network; in response to receiving the request at the second private wireless network, retrieving a unique network identifier value assigned to the first private network; and via the unique network identifier value, detect that the first private wireless network is associated with the second wireless network to support communications.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless roaming services via multiple disparately located private wireless networks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a communication management resource receives notification of a request (such as an IMS service request) from user equipment to establish a wireless communication link with a remote communication device through a first private wireless network (such as a first private 5G network). The communication management resource resides in a second private wireless network (such as a second private 5G network) to which the user of the user equipment is a member (such as an employee). The request requests use of roaming services provided by the first private wireless network to connect the user equipment to a remote communication device.

In addition to receiving the request, the communication management resource of the second private wireless network receives/retrieves a unique network identifier value assigned to the first private network. Via the unique network identifier value, the communication management resource of the second private wireless network detects that the first private wireless network is associated with (such as provides roaming services for users of) the second wireless network. Based on the association, the communication management resource supports communications between the user equipment and the remote communication device.

In one embodiment, the home routed IMS roaming architecture for SNPN is simplified and alleviates interworking issues with a visited P-CSCF, hence, allowing more expedient deployment.

Figure 1:
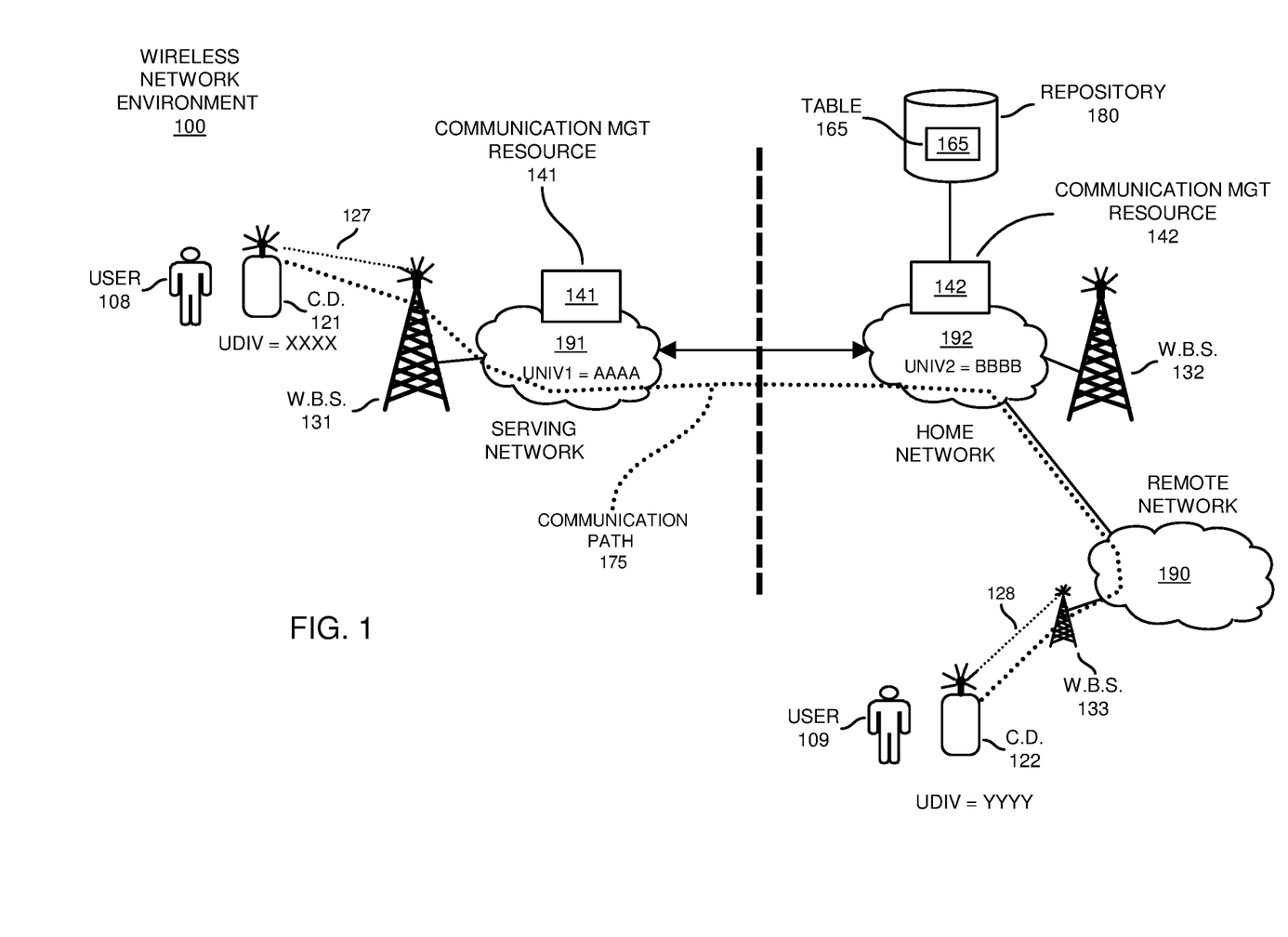
FIG. 1 is an example diagram illustrating connectivity of user equipment to a remote communication device through multiple networks according to embodiments herein.

Now, more specifically, with reference to the drawings, FIG. 1 is an example diagram illustrating connectivity of user equipment to a remote communication device through multiple networks to a target communication device according to embodiments herein.

As shown, wireless network environment 100 includes multiple networks including private wireless network 191 (such as operated by a first private service provider) and private wireless network 192 (such as by a second private service provider).

Wireless network 191 includes communication management resource 141 and is assigned unique network identifier value UNIV1=AAAA (such as based on one or more types of identity information); wireless network 192 includes communication management resource 142 and is assigned unique network identifier value UNIV2=BBBB (such as based on one or more types of identity information).

In general, during operation, as further discussed herein, the private wireless network 191 supports roaming for members of private wireless network 192. The combination of networks provides connectivity of the communication device 121 to a remote network 190.

Note that each of the resources as described herein can be implemented via hardware, executed software, or a combination of hardware and executed software.

For example, the communication management resource 141 can be implemented as communication management hardware, communication management software, or a combination of communication management hardware and communication management software.

The communication management resource 142 can be implemented as communication management hardware, communication management software, or a combination of communication management hardware and communication management software.

The communication device 121 can be implemented as communication hardware, communication software, or a combination of communication hardware and communication software, and so on.

Note further that the first wireless network 191 and the second wireless network 192 can be any suitable type of wireless network.

In one non-limiting example embodiment, the first private wireless network 191 is a serving stand-alone non-public wireless network such as based on 5G or other suitable one or more protocols supporting roaming of the user equipment; the second private wireless network 192 is a home stand-alone non-public wireless network such as based on 5G or other suitable one or more protocols.

Assume in this example embodiment that the user 108 and corresponding communication device 121 (i.e., user equipment) are authorized to use the first private wireless network 191 (such as a serving network) as a guest user (or guest device) for roaming and that the communication device 121 and corresponding user 108 are also members of the second private wireless network 192 (such as a home network).

Figure 2:
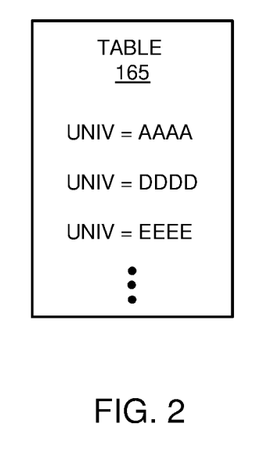
FIG. 2 is an example diagram illustrating registration (policy) information according to embodiments herein.

In such an instance, the communication management resource 142 associated with private wireless network 192 stores an identity of the first private wireless network 191 in table 165 (network affiliation information) of repository 180 as further discussed in FIG. 2. In one embodiment, the table 165 includes identities of other networks in the wireless network environment 100 that provide roaming or other wireless services to members of the private wireless network 192.

In accordance with further example embodiments, the table 165 includes identities of members of the private wireless network 192 that are to be provided roaming services.

FIG. 2 is an example diagram illustrating registration information according to embodiments herein.

In this example embodiment, the table 165 (policy information) indicates other private wireless networks in the wireless network environment 100 that support guest wireless services/connectivity to the members of the (home) private wireless network 192.

More specifically, assume that the service provider (such as a second private company) operating private wireless network 192 has a roaming agreement with the service provider (such as first private company) operating private wireless network 191.

Assume further that the agreement includes enabling member users (such as user 108 and corresponding communication device 121) of the second private wireless network 192 to use wireless services associated with the first private wireless network 191. In such an instance, the table 165 includes an identity (UNIV1=AAAA) associated with the private wireless network 191 as a roaming service provider associated with the second private wireless network 192.

Thus, inclusion of the unique network identifier value UNIV1=AAAA in the table 165 indicates that the private wireless network 191 is an authorized network in which to provide the communication device 121 roaming wireless communication services through a combination of wireless network 191 and wireless network 192 as further discussed below.

Referring again to FIG. 1, when in wireless range of wireless base station 132, the communication device 121 has access to the remote network 190 (such as the Internet, land mobile or cellular network, etc.) via communications through the wireless base station 132 and wireless network 192 to the remote network 190. However, when out of range of the private wireless network 192, the communication device 121 must rely on use of supplemental roaming services provided by the private wireless network 191.

As previously discussed, the operator of the wireless network 191 supports roaming of the communication device 121 and connectivity to the remote network 190 when the communication device 121 is outside of a wireless range of the wireless network 191 and corresponding one or more wireless base stations.

In one embodiment, to establish a wireless communication link between the communication device 121 and the private wireless network 191 while the communication device 121 is roaming and out of range with respect to the second private wireless network 192 and corresponding one or more wireless base stations, the communication device 121 communicates a communication link request to the wireless base station 131 of the first private wireless network 191 via wireless communication link 127.

The first private wireless network 191, such as via the communication management resource 141, communicates the link request (such as including a SIP registration request) to the communication management resource 142 in the second private wireless network 192.

In one nonlimiting example embodiment, the communication device 121 generates the link request to establish a respective call connection with the communication device 122 operated by the user 109.

In one embodiment, the request from the communication device 121 to establish a respective wireless communication link includes an identity (such as the unique device identifier value UDIV1=XXXX) of the communication device 121. In one embodiment, the value XXXX is a network address assigned to the communication device 121.

Via the unique device identifier value=XXXX and potentially other credentials as well associated with the communication device 121, the communication management resource 142 determines that the communication device 121 is an authorized member of the second private wireless network 192.

Based on notification of the request to establish a respective wireless communication link and connectivity, in furtherance of providing requested connectivity to the authorized user 108, the communication management resource 142 in the second private wireless network 192 retrieves (such as via communications with the communication management resource 141 in the first private wireless network 191) a unique network identifier value (UNIV1=AAAA) assigned to the first private network 191.

In one embodiment, forwarding of the roaming request associated with the communication device 121 includes communicating an identifier (such as AAAA or other suitable one or more values) of the private wireless network 191 from the communication management resource 141 to the communication management resource 142 of the primary wireless network 192.

Via the unique network identifier value (such as received value=UNIV1=AAAA), the communication management resource 142 detects that the first private wireless network 191 has an association (according to a roaming support agreement) with the second wireless network 192 and that the communication device 121 should be provided requested wireless services. In one embodiment, the communication management resource 142 performs a look-up in table 165 (policy information) to determine if the private wireless network 192 is authorized to support roaming services to members of the second private wireless network 192.

Based on the detected association, and that the first private wireless network 191 is a roaming partner with respect to the private wireless network 191, the communication management resource 142 in the second private wireless network 192 supports communication services between the communication device 121 and the remote communication device 122 via a communication path 175 extending through a combination of the first private wireless network 191 and the second private wireless network 192.

In such an instance, the communication path 175 between the communication device 121 and communication device 122 includes connectivity provided by multiple resources including wireless base station 131, private wireless network 191, private wireless network 192, remote network 190, and wireless base station 133.

Thus, in one embodiment, based on the detected association and corresponding agreement between service providers of the first private wireless network 191 and the second private wireless network 192, the communication management resource 142 establishes a communication path (link) between the first private wireless network 191 through the second private wireless network 192 to the remote network 190 in response to detecting that the first private wireless network 191 is authorized to support communications associated with the communication device 121 through the first private wireless network 191.

In one embodiment, the services requested by the communication device 121 are voice services supporting wireless connectivity between the communication device 121 and a remote mobile communication device 122 via connectivity between the (mobile) communication device 121 through a combination of the first private wireless network and the second private wireless network to the remote (target) communication device 122. In one embodiment, the communication device 121 (user equipment) generates the request to establish a respective voice phone call to the remote communication device 122.

Via communications over the communication path 175, the user communicates with the user 109 operating (mobile) communication device 122.

Note again that the communication management resource 141 and communication management resource 142 can be implemented in any suitable manner. In one nonlimiting example embodiment, the communication management resource 141 and the communication management resource 142 include resources as shown in FIG. 3 supporting management functions and signaling to create the communication path 175 and support communications associated with the communication path 175.

Figure 3:
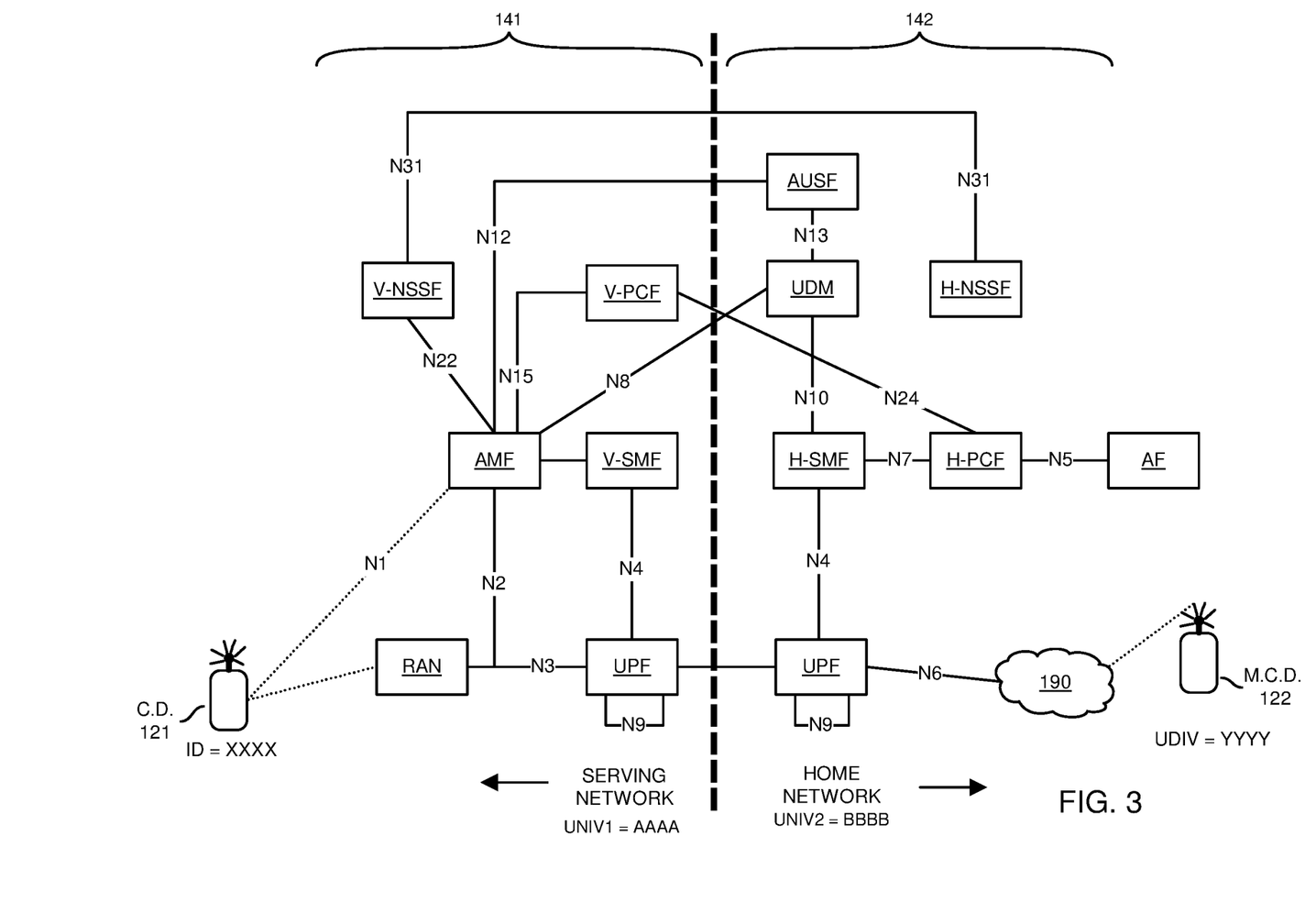
FIG. 3 is an example diagram illustrating connectivity of multiple networks according to embodiments herein.

FIG. 3 is an example diagram illustrating connectivity of multiple networks according to embodiments herein.

As shown, private wireless network 191 and corresponding communication management resource 141 includes hardware and software resources such as V-NSSF (Visited—Network Slice Selection Function), V-PCF (Visited—Policy Control Function), AMF (Access and Mobility Management Function), V-SMF (Visited—Session Management Function), RAN (Radio Access Network), and UPF (User Plane Function).

As shown, private wireless network 192 and corresponding private wireless network 192 includes hardware and software resources such as AUSF (Authentication Server Function), UDM (Unified Data Management), H-NSSF (Home—Network Slice Selection Function), H-SMF (Visited—Session Management Function), H-PCF (Home—Policy Control Function), AF, and UPF (User Plane Function).

In a manner as previously discussed, and as further discussed below, the combination of private wireless network 191 and private wireless network 192 support connectivity of the communication device 121 to the communication device 122 via a corresponding communication path 175.

In one example embodiment, the connectivity solution being proposed here is to avoid IMS roaming within the SNPN. In such an instance, this means that the P-CSCF is continued to be located at the home SNPN (i.e., private wireless network 192). This avoids the additional interworking complexity with the P-CSCF at the serving network as the P-CSCF may only support IMS AKA and not any other authentication schemes used by home SNPN. When the P-CSCF is located at the home network SNPN as described herein, mutual authentication occurs between the client (i.e., UE) and all the IMS nodes at the home SNPN (communication management resource 142 of the private wireless network 192).

Figure 4:
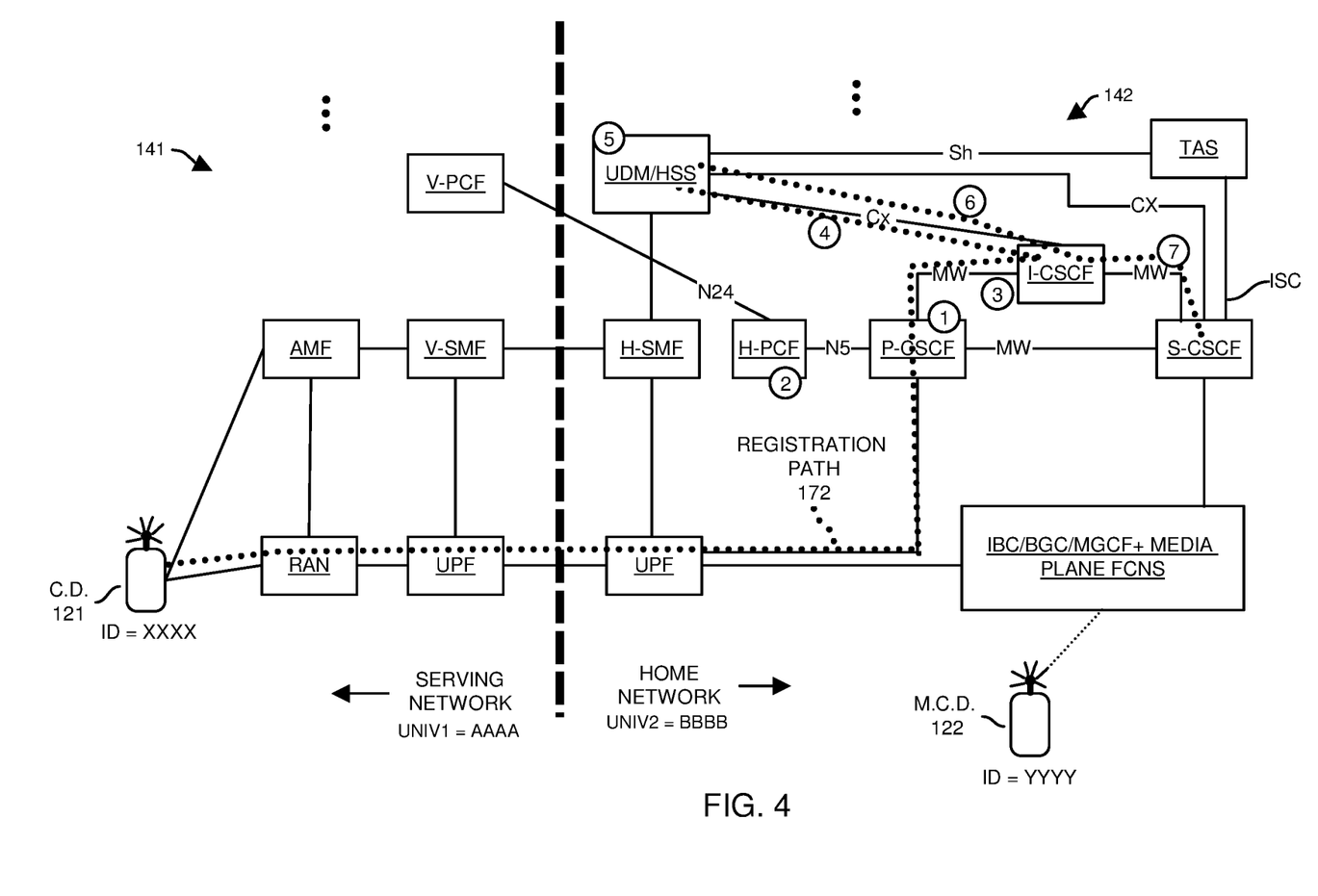
FIG. 4 is an example diagram illustrating session signaling to establish connectivity according to embodiments herein.

If desired, for the SNPN roaming architecture in FIG. 4, embodiments herein include reuse of the baseline architecture from TS 23.501, namely, "FIG. 4.2.4-6: Roaming 5G System architecture-Home routed scenario in reference point representation" with enhancements as described herein.

FIG. 4 is an example diagram illustrating signaling (such as SIP registration signaling or other suitable signaling) to establish a communication link through multiple networks according to embodiments herein.

In this example embodiment, in a similar manner as previously discussed, the private wireless network 191 and corresponding communication management resource 141 includes hardware and software resources such as V-PCF (Visited—Policy Control Function), AMF (Access and Mobility Management Function), V-SMF (Visited—Session Management Function), RAN (Radio Access Network), and UPF (User Plane Function).

As further shown, private wireless network 192 and corresponding communication management resource 142 includes hardware and software resources such as UDM/HSS (Unified Data Management/Home Subscriber Server), H-SMF (Home—Session Management Function), H-PCF (Home—Policy Control Function), P-CSCF (Proxy Call Session Control Function), I-CSCF (Intermediate Proxy Call Session Control Function), S-CSCF (Serving Call Session Control Function), TAS (Telephony Application Server), and UPF (User Plane Function).

To enable the use of home network (private wireless network 192) routed architecture for IMS, embodiments herein include the following supplemental operations. FIG. 4 includes a depiction of registration path 172 (such as a SIP signaling path) supporting registration and establishment of requested connectivity as described herein.

For example, via operation #1, the P-CSCF subscribes to the PCF to be notified of the SNPN ID (UNIV1=AAAA) of the Serving network (private wireless network 191). In one embodiment, the unique network identifier value UNIV1 is designated as PLMN ID+NID.

In operation #2, the Npcf_PolicyAuthorization_Notify service operation in the N5 interface (signaling) adds "PlmnIdNid" information elements (such as AAAA) in the communications.

In operation #3, the H-PCF notifies the P-CSCF of the SNPN ID (PLMN ID+NID or UNIV1=AAAA) associated with the serving private wireless network 191.

In operation #4, the Cx-Query is modified to include the SNPN ID (PLMN ID+NID or UNIV1=AAAA) of the serving private wireless network 191.

In operation #5, based on SNPN ID (PLMN ID+NID or UNIV1=AAAA) of the private wireless network 191, the UDM/HSS either rejects or allows the requested IMS registration associated with communication device 121, depending on local home operator policy (such as table 165) and whether it allows private wireless network 191 to support roaming.

Figure 5:
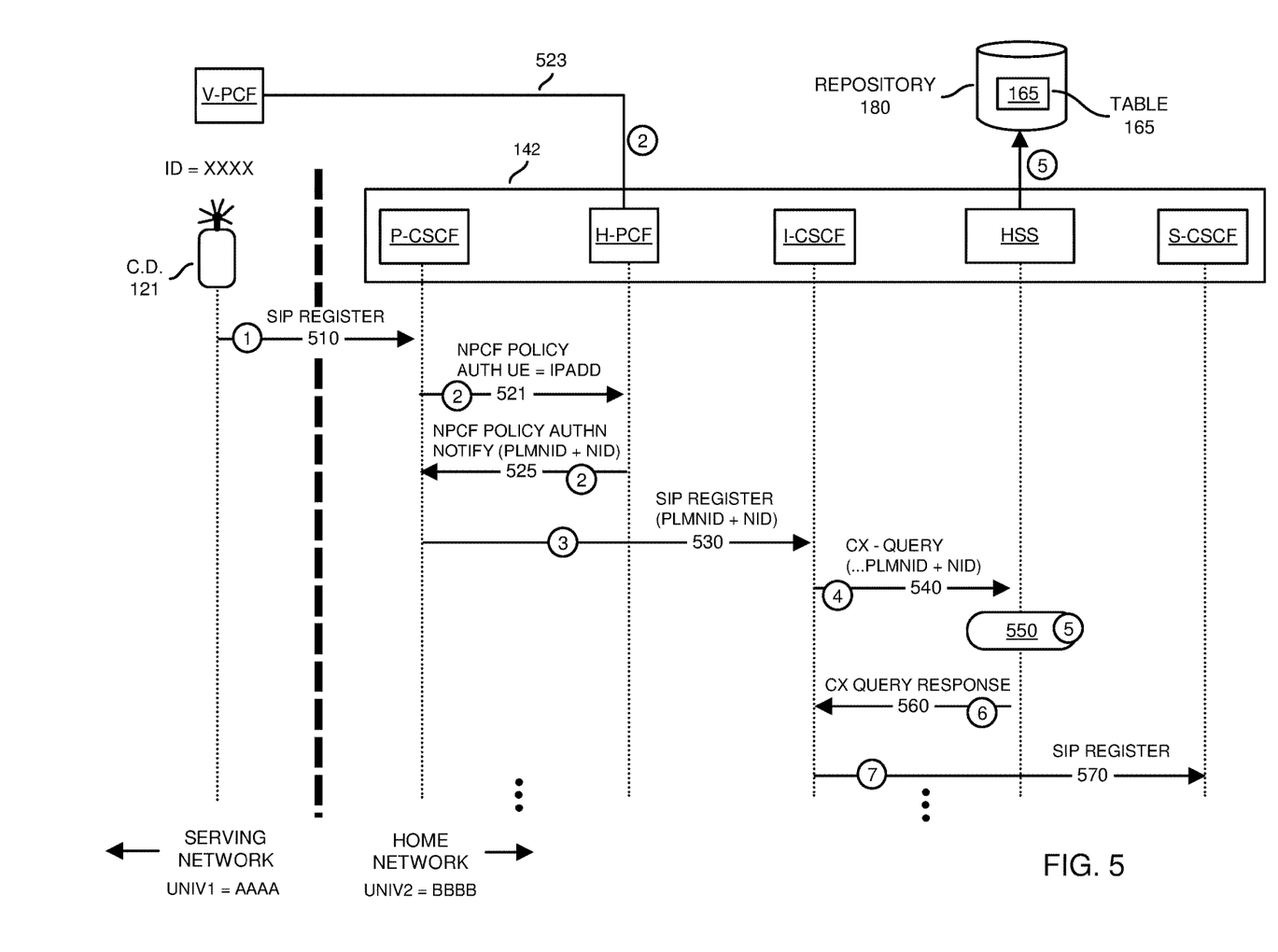
FIG. 5 is an example diagram illustrating a flow of communications facilitating establishment of session connectivity and a communication link (such as via SIP registration) according to embodiments herein.

FIG. 5 is an example diagram illustrating a flow of communications facilitating establishment of a communication link according to embodiments herein.

In operation #1, and via communications 510, the communication device 121 sends a request (such as an SIP REGISTER request) through private wireless network 191 to the P-CSCF of private wireless network 192. In one embodiment, the request associated with communications 510 includes the unique device identifier value XXXX (such as network address) associated with the communication device 121.

As previously discussed, in one embodiment, the communication device 121 (user equipment) generates the request in order to establish a voice communication session (such as a phone call) with a remote communication device 122 over the (serving) first private wireless network 191. As further discussed below, in response to receiving the request, the communication management resource 142 (corresponding components such as P-CSCF, H-PCF, I-CSCF, and HSS) establishes the communication path 175 extending between the communication device 121 through a combination of the first private wireless network 191 and the second private wireless network 192, connecting the communication device 121 to the remote communication device 122.

In operation #2, and via communications 521, the P-CSCF of the private wireless network 192 communicates an identity associated with the communication device 121 to the H-PCF. In one embodiment, the P-CSCF communicates the network address of the communication device 121 (such as unique device identifier value=XXXX) to the H-PCF. In one embodiment, via the received unique device identifier value, the H-PCF detects that the requesting communication device 121 is a member of the second private wireless network 192.

Subsequent to detecting that requesting communication device 121 is a member of the private wireless network 192 based on the received network address=XXXX, via communications 523, the H-PCF of communication management resource 142 queries the V-PCF in private wireless network 191 for its unique network identifier value.

As previously discussed, in one embodiment, the unique network identifier value assigned to the private wireless network 191 can be any suitable value and retrieved from any suitable resource. In one embodiment, the unique network identifier value is a PLMNID (Public Land Mobile Network IDentifier) and NID (Network IDentifier) assigned to the first private wireless network 191.

In response to the query from the P-CSCF, such as via N24 signaling, the V-PCF of the private wireless network 191 returns a value such as the PLMN-ID+NID (such as value UNIV1=AAAA) of the serving SNPN (private wireless network 191).

As further shown, via communications 525, the H-PCF communicates the unique network identifier value (such as PLMN ID+NID) associated with the private wireless network 191 to the P-CSCF of private wireless network 192. In one embodiment, the H-PCF communicates unique network identifier value of AAAA to the P-CSCF in an NPCF policy authentication notification.

Via communications 530 in operation #3, the P-CSCF includes the received unique network identifier value=AAAA (such as PLMN ID+NID) in the SIP REGISTER request before forwarding the request to the I-CSCF.

Via communications 540 in operation #4, the I-CSCF includes the unique network identifier value AAAA (such as PLMN ID+NID) associated with the private wireless network 191 to the HSS (of communication management resource 142) in a Cx-Query message as part of the Normal IMS registration procedure. Thus, the HSS receives the identity of the private wireless network 191 that potentially supports roaming services.

Via function 550, the HSS determines, based on a local policy such as via table 165, whether this IMS registration request from the communication device 121 and private wireless network 191 can be accepted or not. In one embodiment, the acceptance is based on any IMS roaming restrictions associated with the private wireless network 191 (Serving SNPN) identified by the unique network identifier value=AAAA (PLMN ID+NID).

More specifically, in one nonlimiting example embodiment as shown in FIG. 5, via function 550, the HSS accesses the policy information in table 165 to determine whether the user equipment is entitled to use the requested communications services as specified by the request. For example, the HSS compares the unique network identifier value AAAA to the values in a look-up table (policy data) for an indication of whether the private wireless network 191 is authorized to support roaming associated with members of the private wireless network 192. In this example embodiment, the table includes value AAAA, indicating that the private wireless network 191 is an authorized roaming partner associated with the private wireless network 192.

In response to detecting presence of the identity of the unique network identifier value in the look-up table 165, and that the private wireless network 191 is a valid serving network supporting roaming wireless services, the communication management resource 142 enables (via a conventional IMS registration procedure) use of the private wireless network 192 (and communication path 175) to connect the communication device 121 to the communication device 122 to support voice communications.

Via communications 560, and operation #6, the HSS communicates the Cx query response (including the unique network identifier value AAAA) to the I-CSCF.

Via communication 570, and operation #7, the I-CSCF communicates the SIP register request to the S-CSCF.

Figure 6:
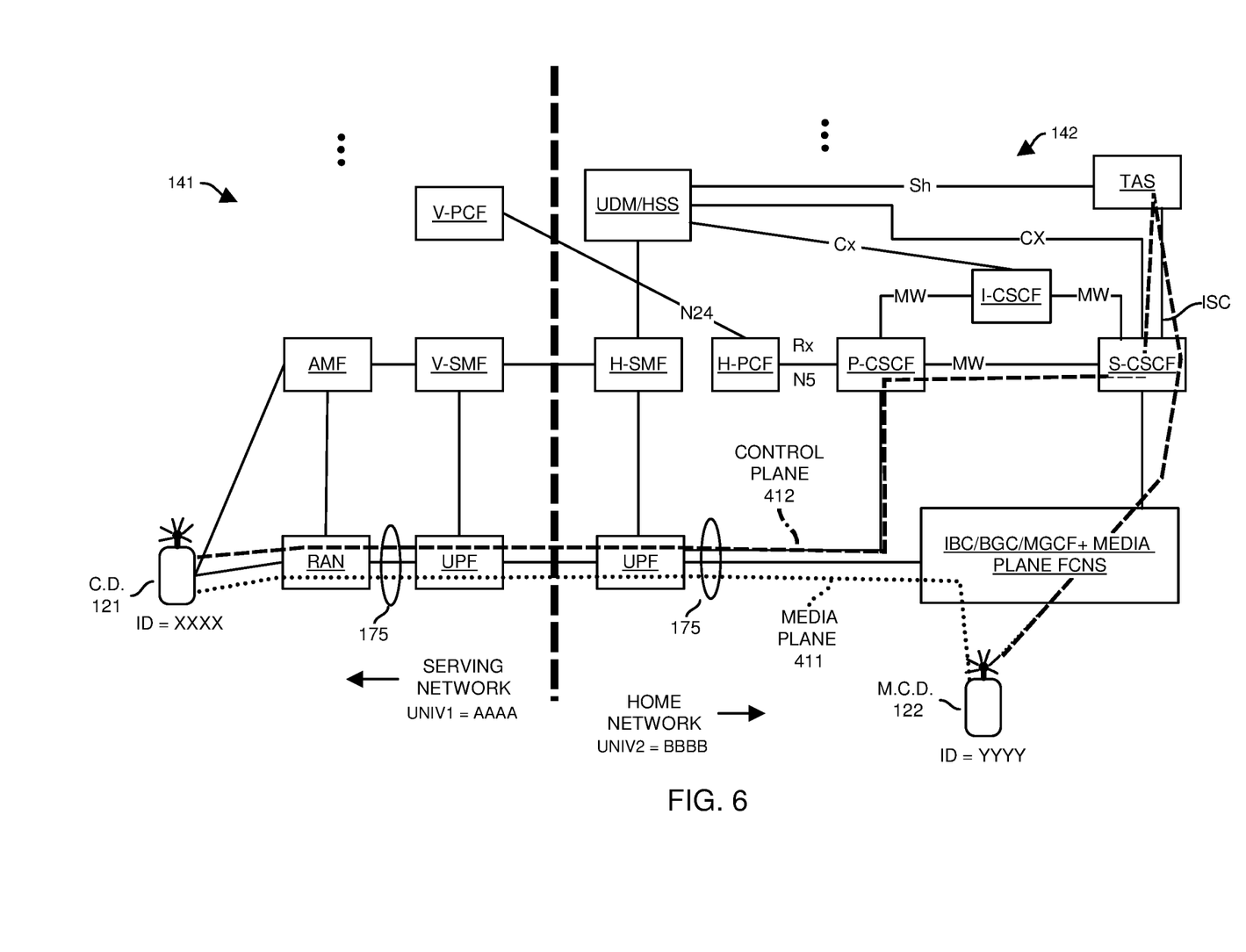
FIG. 6 is an example diagram illustrating established connectivity extending through multiple networks according to embodiments herein.

FIG. 6 is an example diagram illustrating a communication link extending through multiple networks according to embodiments herein.

As further shown in this example embodiment, the combination of private wireless network 191 and private wireless network 192 establish the communication path 175 (connectivity) in a manner as previously discussed via SIP registration. In one embodiment, the communication path 175 includes a media plane 411 and control plane 412 supporting the connectivity.

As its name suggests, in one embodiment, the media plane 411 supports voice communications between the communication device 121 and the communication device 122.

Figure 7:
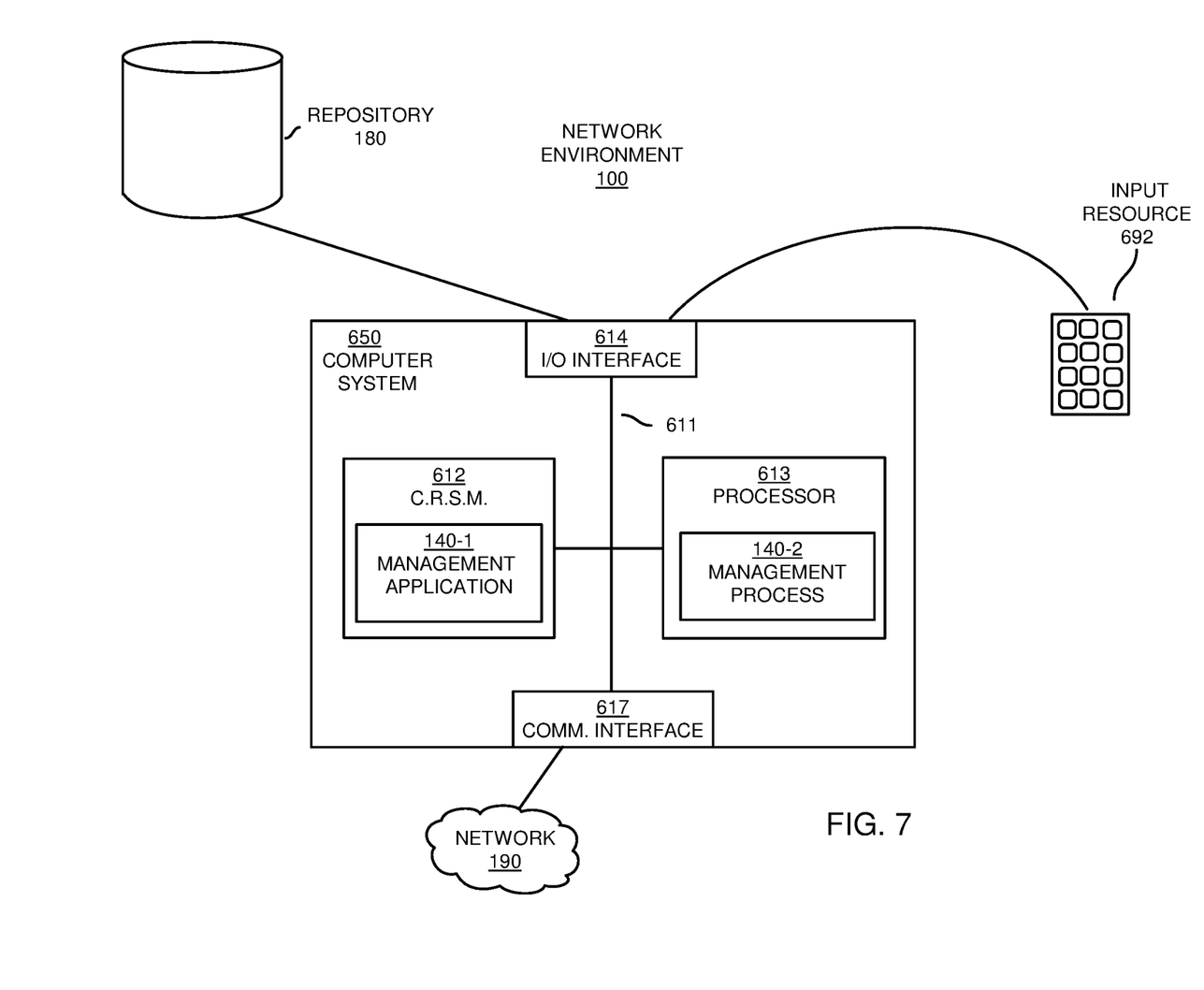
FIG. 7 is a diagram illustrating example computer architecture to execute one or more operations according to embodiments herein.

FIG. 7 is an example block diagram of a computer system for implementing any of the operations as discussed herein according to embodiments herein.

As previously discussed, any of the resources (such as communication device 121, communication management resource 141, communication management resource 142, private wireless network 191, private wireless network 192, UDM/HSS (Unified Data Management/Home Subscriber Server), H-SMF (Home—Session Management Function), H-PCF (Home—Policy Control Function), P CSCF (Proxy Call Session Control Function), I CSCF (Intermediate Proxy Call Session Control Function), S CSCF (Serving Call Session Control Function), TAS (Telephony Application Server), and UPF (User Plane Function, etc.) as discussed herein can be configured to include computer processor hardware and corresponding executable instructions to carry out the different operations as discussed herein.

As shown, computer system 650 of the present example can include an interconnect 611 that couples computer readable storage media 612 such as a non-transitory type of media (such as a type of hardware storage medium) in which digital information can be stored and retrieved, a processor 613, I/O interface 614, and a communications interface 617.

I/O interface 614 supports connectivity to repository 680 and input resource 692.

Computer readable storage medium 612 can be any hardware storage device such as memory, optical storage, hard drive, floppy disk, etc. In one embodiment, the computer readable storage medium 612 stores instructions and/or data.

As shown, computer readable storage media 612 can be encoded with management application 140-1 (e.g., including instructions) to carry out any of the operations as discussed herein. As previously discussed, the management application 140-1 can be configured to implement any of the operations as described herein such as those provided by communication management resource 142, communication management resource 141, etc.

During operation of one embodiment, processor 613 accesses computer readable storage media 612 via the use of interconnect 611 in order to launch, run, execute, interpret or otherwise perform the instructions in network management application 140-1 stored on computer readable storage medium 612. Execution of the network management application 140-1 produces network management process 140-2 to carry out any of the operations and/or processes as discussed herein.

Those skilled in the art will understand that the computer system 650 can include other processes and/or software and hardware components, such as an operating system that controls allocation and use of hardware resources to network management application 140-1.

In accordance with different embodiments, note that computer system may be or included in any of various types of devices, including, but not limited to, a mobile computer, user equipment, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 650 may reside at any location or can be included in any suitable resource in any network environment to implement functionality as discussed herein.

Functionality supported by the different resources as described herein will now be discussed via the method flowchart in FIG. 7. Note that the steps in the flowcharts below can be executed in any suitable order.

Figure 8:
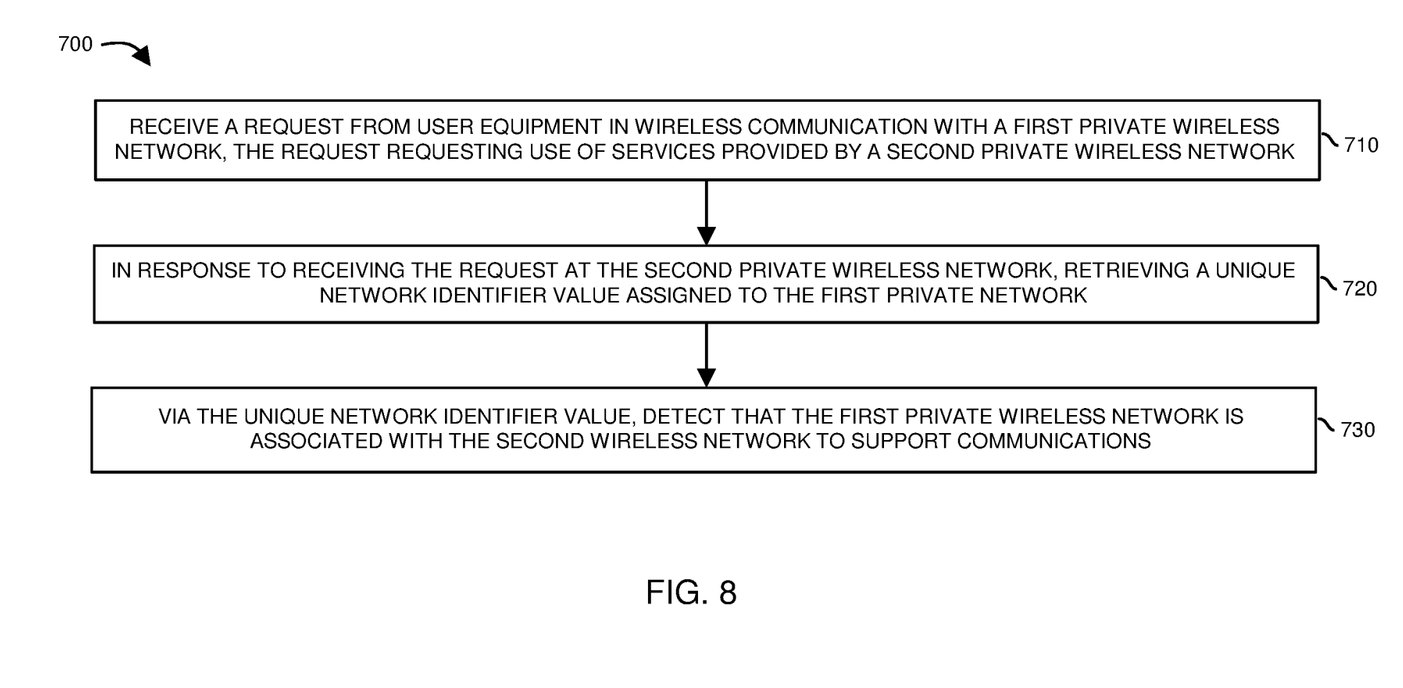
FIG. 8 combine to illustrate an example method according to embodiments herein.

FIG. 8 is a flowchart 700 illustrating an example method according to embodiments. Note that there will be some overlap with respect to concepts as discussed above.

In processing operation 710, the communication management resource 142 receives a request (such as via communications 410) from user equipment (such as communication device 121) in wireless communication with a first private wireless network 191. The request requests use of wireless services such as provided by the second private wireless network 192.

In processing operation 720, in response to receiving the request at the second private wireless network 192, the communication management resource 142 receives a unique network identifier value (UNIV1=AAAA such as a PLM-NID+NID) assigned to the first private network 191.

In processing operation 730, via the received unique network identifier value, the communication management resource 142 detects that the first private wireless network 191 is associated with the second wireless network 192 to support wireless services such as connectivity of the communication device 121 through the second private wireless network 192 to a target device in remote network 190.

Note again that techniques herein are well suited to facilitate connectivity via coordination of multiple private wireless networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving a request originating from user equipment in wireless communication with a first private wireless network, the request received by a communication management resource of a second private wireless network, the request from the user equipment requesting use of services provided by the second private wireless network;
   via the communication management resource, retrieving a unique network identifier value assigned to the first private wireless network; and
   via the unique network identifier value, detecting that the first private wireless network is associated with the second private wireless network to support communications.

2. The method as in claim 1, wherein the first private wireless network is a serving stand-alone non-public network; and wherein the second private wireless network is a home stand-alone non-public network supporting roaming of the user equipment.

3. The method as in claim 1, wherein the services are voice services supporting wireless connectivity between the user equipment and a remote mobile communication device via connectivity between the user equipment through a combination of the first private wireless network and the second private wireless network to the remote mobile communication device.

4. The method as in claim 1, wherein the request is an SIP (Session Initiation Protocol) registration request, the request enabling the second private wireless network to retrieve the unique identifier value from the first private wireless network and register the user equipment to use the second private wireless network.

5. The method as in claim 1, wherein retrieving the unique network identifier value assigned to the first private wireless network includes, via the communication management resource, communicating with the first private wireless network.

6. The method as in claim 1, wherein the request includes a unique device identifier value assigned to the user equipment; and
using the unique device identifier value to retrieve the unique network identifier value indicating the identity of the first private wireless network.

7. The method as in claim 1 further comprising:
retrieving the unique network identifier value assigned to the first private wireless network via N24 signaling between the second private wireless network and the first private wireless network.

8. The method as in claim 1 further comprising:
detecting presence of the unique network identifier value in a look-up table, presence of the identity in the look-up table indicating that the user equipment is authorized to use the first private wireless network.

9. The method as in claim 1, wherein the first private wireless network is operated by a first service provider; and
wherein the second private wireless network is operated by a second service provider, the second private wireless network operated independently of the first service provider.

10. The method as in claim 1, wherein the user equipment in wireless communication with the first private wireless network generates the request to establish a voice communication session with a remote communication device over the first private wireless network.

11. The method as in claim 10, wherein a communication link extending between the first private wireless network and the second private wireless network supports the voice communication session with the remote communication device in response to the request.

12. The method as in claim 1 further comprising:
establishing a communication link between the first private wireless network and the second private wireless network in response to detecting that the second private wireless network is authorized to support communications associated with the user equipment through the first private wireless network.

13. The method as in claim 1, wherein the unique network identifier value is a combination of a PLMNID (Public Land Mobile Network IDdentifier) and NID (Network IDentifier) assigned to the first private wireless network.

14. The method as in claim 1 further comprising:
detecting that the user equipment is a member of the second private wireless network via the unique device identifier value.

15. The method as in claim 14 further comprising:
via the communication management resource, in response to detecting that the user equipment is a member of the second private wireless network based on the unique device identifier value, communicating with the first private wireless network to retrieve the unique network identifier value of the first private wireless network.

16. The method as in claim 15, wherein the unique network identifier value is a combination of a PLMNID (Public Land Mobile Network IDdentifier) and NID (Network IDentifier) assigned to the first private wireless network.

17. The method as in claim 15 further comprising:
utilizing the unique network identifier value to register the user equipment to use the second private wireless network.

18. The method as in claim 17 further comprising:
establishing a communication link between the first private wireless network and the second private wireless network in response to detecting that the second private wireless network is authorized to support communications associated with the user equipment through the first private wireless network.

19. The method as in claim 1 further comprising:
providing the user equipment access to the second private wireless network through the first private wireless network in response to detecting that the first private wireless network is associated with the second private wireless network to support communications.

20. The method as in claim 1, wherein retrieving the unique network identifier value assigned to the first private wireless network includes querying the first private wireless network for the unique network identifier value in response to detecting that the user equipment is a member of the second private wireless network.

21. The method as in claim 20, wherein detecting that the first private wireless network is associated with the second private wireless network includes comparing the unique network identifier value to a set of stored values.

22. The method as in claim 21, wherein the stored values indicate identities of roaming partners associated with the second private wireless network.

23. The method as in claim 1 further comprising:
receiving the request via messaging from the user equipment through a wireless base station of the first private wireless network to the second private wireless network.

24. A system comprising:
a communication management resource operative to:
receive a request originating from user equipment in wireless communication with a first private wireless network, the communication management resource associated with a second private wireless network, the request from the user equipment requesting use of services provided by the second private wireless network;
retrieve a unique network identifier value assigned to the first wireless private network; and
via the unique network identifier value, detect that the first private wireless network is associated with the second private wireless network to support communications.

25. The system as in claim 24, wherein the first private wireless network is a serving stand-alone non-public network; and
wherein the second private wireless network is a home stand-alone non-public network supporting roaming of the user equipment.

26. The system as in claim 24, wherein the services are voice services supporting wireless connectivity between the user equipment and a remote mobile communication device via connectivity between the user equipment through a combination of the first private wireless network and the second private wireless network to the remote mobile communication device.

27. The system as in claim 24, wherein the request is an SIP (Session Initiation Protocol) registration request, the request enabling the second private wireless network to retrieve the unique identifier value from the first private wireless network.

28. The system as in claim 24, wherein the communication management resource is operable to:
communicate with the first private wireless network to retrieve the unique network identifier value.

29. The system as in claim 24, wherein the request includes a unique device identifier value assigned to the user equipment; and
wherein the communication management resource is further operative to use the unique device identifier value to retrieve the unique network identifier value.

30. The system as in claim 24, wherein the communication management resource is operable to:
receive the unique network identifier value assigned to the first private wireless network via N24 signaling between the second private wireless network and the first private wireless network.

31. The system as in claim 24, wherein the communication management resource is operable to:
detect presence of an identity of the unique network identifier value in a look-up table, presence of the identity in the look-up table indicating that the user equipment is authorized to use the first private wireless network.

32. The system as in claim 24, wherein the first private wireless network is operated by a first service provider; and wherein the second private wireless network is operated by a second service provider, the second private wireless network operated independently of the first service provider.

33. The system as in claim 24, wherein the user equipment generates the request to establish a voice communication session with a remote communication device over the first private wireless network.

34. The system as in claim 33, wherein a communication link extending between the first private wireless network and the second private wireless network supports the voice communication session with the remote communication device.

35. The system as in claim 24, wherein the communication management resource is operable to:
establish a communication link between the second private wireless network and the first private wireless network in response to detecting that the second private wireless network is authorized to support communications associated with the user equipment through the first private wireless network.

36. The system as in claim 24, wherein the unique network identifier value is a combination of a PLMNID (Public Land Mobile Network IDdentifier) and NID (Network IDentifier) assigned to the first private wireless network.

37. Computer-readable storage hardware having instructions stored thereon, the instructions, when carried out by computer processor hardware, cause the computer processor hardware to:
receive a request originating from user equipment in wireless communication with a first private wireless network, the computer processor hardware disposed in a second private wireless network, the request from the user equipment requesting use of services provided by the second private wireless network;
retrieve a unique network identifier value assigned to the first wireless private network; and
via the unique network identifier value, detect that the first private wireless network is associated with the second private wireless network to support communications.

* * * * *

UNITED STATES PATENT AND TRADEMARK OFFICE
CERTIFICATE OF CORRECTION

PATENT NO. : 11,310,845 B2
APPLICATION NO. : 16/850133
DATED : April 19, 2022
INVENTOR(S) : Wong et al.

Page 1 of 1

It is certified that error appears in the above-identified patent and that said Letters Patent is hereby corrected as shown below:

In the Claims

Column 16, Line 63, delete "wireless private", insert --private wireless--

Column 18, Line 38, delete "wireless private", insert --private wireless--

Signed and Sealed this
Twenty-first Day of June, 2022

Katherine Kelly Vidal
*Director of the United States Patent and Trademark Office*